United States Patent
Merriam et al.

(10) Patent No.: US 10,802,905 B2
(45) Date of Patent: Oct. 13, 2020

(54) NETWORKED DATA SYSTEM FOR DATA TRANSMISSION REMEDIATION

(71) Applicant: Bank of America Corporation, Charlotte, NC (US)

(72) Inventors: Marie S. Merriam, Charlotte, NC (US); Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 247 days.

(21) Appl. No.: 15/987,487

(22) Filed: May 23, 2018

(65) Prior Publication Data

US 2019/0361768 A1 Nov. 28, 2019

(51) Int. Cl.
*G06F 11/00* (2006.01)
*G06F 11/07* (2006.01)
*G06N 3/04* (2006.01)

(52) U.S. Cl.
CPC ...... *G06F 11/0793* (2013.01); *G06F 11/0709* (2013.01); *G06F 11/0751* (2013.01); *G06N 3/04* (2013.01)

(58) Field of Classification Search
CPC ............ G06F 11/0793; G06F 11/0709; G06F 11/0751
See application file for complete search history.

(56) References Cited

U.S. PATENT DOCUMENTS

| | | | |
|---|---|---|---|
| 6,115,690 A | 9/2000 | Wong | |
| 6,647,420 B2 | 11/2003 | Hellbusch et al. | |
| 7,451,107 B1 | 11/2008 | Chvala et al. | |
| 7,610,379 B2 | 10/2009 | Hellbusch et al. | |
| 8,214,263 B2 | 7/2012 | Grieder et al. | |
| 8,321,297 B2 | 11/2012 | Grieder et al. | |
| 8,386,332 B2 | 2/2013 | Grieder et al. | |
| 8,775,230 B2 | 7/2014 | Casas et al. | |
| 8,775,231 B1 | 7/2014 | Nipko et al. | |
| 9,026,472 B2 | 5/2015 | Pappas et al. | |

(Continued)

OTHER PUBLICATIONS https://www.business.com/articles/b2b-sharing-economy/—Jul. 5, 2017.

(Continued)

*Primary Examiner* — Katherine Lin
(74) *Attorney, Agent, or Firm* — Banner & Witcoff, Ltd.; Michael A. Springs

(57) ABSTRACT

Systems, apparatuses, and methods for remediating the transmission of data from a sending computing device to a receiving computing device. An administrative computing device may determine data that has been transmitted and a predicted transmission path taken by the transmitted data. The administrative computing device may include or be communicatively coupled with a machine learning model. The administrative computing device may receive, from one or more computing devices involved in transmitting the transmitted data, status data corresponding to the transmitted data. The status data may include, for example, timestamps associated with the data, hash values of the data, processing information associated with the data, or the like. Based on the status data, the administrative computing device may cause one or more computing devices to take remedial actions.

17 Claims, 5 Drawing Sheets

(56) References Cited

U.S. PATENT DOCUMENTS 9,031,860 B2  5/2015 Winters et al.
2018/0052739 A1* 2/2018 Castagna ............ G06F 11/1438

OTHER PUBLICATIONS http://www.co-society.com/b2b-sharing-next-logical-step-sharing-economy/—Jul. 10, 2017.
https://channels.theinnovationenterprise.com/articles/how-the-sharing-company-is-revolutionizing-b2b.
http://www.vtt.fi/sites/SHARE/en/what-is-b2b-sharing-economy.

* cited by examiner

NETWORKED DATA SYSTEM FOR DATA TRANSMISSION REMEDIATION

TECHNICAL FIELD

This application generally relates to the remediation of data transmission and processing in electrical computers and digital processing systems. More particularly, aspects of this application are directed to distributed data processing, multicomputer data transferring and processing, and the like.

BACKGROUND

As enterprise systems become larger and more complex, the possibility for any given computing device of an enterprise system to cause delay affecting multiple other devices is significant. For example, data may need to be transmitted through five computing devices in sequence, some performing processing operations and others merely receiving and transmitting the data, and the failure of one computing device in the sequence may have significant delay implications for the ability to process and transmit the file through the subsequent computing devices. Such a failure need not involve a loss of data, but may involve excessive processing delays, undesirable modifications to the data in transit, and the like. Identifying and remediating such failures may be difficult in no small part due to the distributed nature of computing devices: if scores of computing devices all are required to transmit data from a sending computing device to a receiving computing device, identifying the particular location of a fault in those devices could consume significant amounts of time.

The aforementioned problems may become worse when multiple entities, such as multiple corporations with different sets of computing devices, become involved. For example, to effectuate processing of a file, a first company may, via a first device, send the file to a second device associated with a second company, which may process the file and transmit the processed file to a third device associated with a third company. Because the companies may be on very different networks and in different locations, tracking the location and integrity of the file within any particular company, let alone knowing its processing status and/or failures in the transmission of the file, may be nearly impossible.

Relatedly, the processing and transmission of data by a large plurality of devices can expose the files to integrity risks. Errors in transmission, for example, can corrupt portions or all of a file. Similarly, undesirable modifications of the file may occur by an intermediary device between a sender and an intended recipient. Detecting and remediating the cause of such errors can be important to ensuring the reliable transmission of data.

SUMMARY

The following summary presents a summary of certain features. The summary is not an extensive overview and is not intended to identify key or critical elements.

Systems, apparatuses, and methods are described for determining a processing status and an integrity of data in a network. An administrative computing device may determine a sender and intended recipient of transmitted data. The administrative computing device may include an artificial neural network and/or a machine learning model. Based on the sender and recipient, the administrative computing device may determine one or more intermediary computing devices which may receive, transmit, and/or process the transmitted data. The sending computing device, receiving computing device, and the one or more intermediary computing devices may include one or more transmission paths. The administrative computing device may query the sender, recipient, and/or intermediary computing devices for status data corresponding to the transmitted data. Based on the status data, the administrative computing device may determine, for example, if the data was lost and/or corrupted, whether an error in processing occurred, and/or whether transmission of the data involved anything that would warrant a remedial action.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Figure 1:
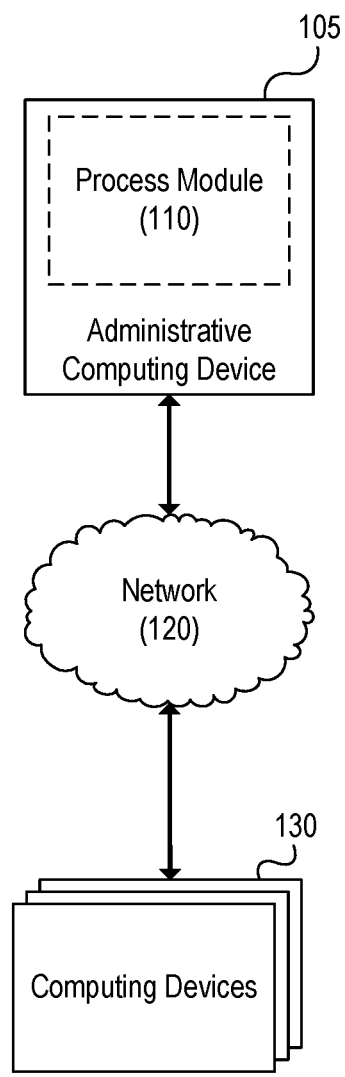
FIG. 1 shows a network diagram comprising an example of an administrative computing device.

FIG. 1 is a simplified network diagram comprising an administrative computing device 105 executing a process module 110. The administrative computing device 105 is connected, over a network 120, to one or more computing devices 130.

The administrative computing device 105 and the one or more computing devices 130 may be all or portions of any type of computing device. Such computing devices may include all or portions of servers, personal computers, smartphones, and/or any other device comprising a processor and/or memory storing instructions that, when executed by the processor, perform one or more steps. The computing devices may be logical or virtual, such that a single physical computing device (e.g., a server) may manage one or more computing devices (e.g., multiple instances of virtual machines in software). Though depicted as a single computing device, the administrative computing device 105 may be a plurality of computing devices, such as a network of servers. As will be described below in greater detail with respect to FIG. 5, all or portions of the administrative computing device 105 and/or the process module 110 may be all or portions of an artificial neural network.

The network 120 may be any type of network which may communicatively couple the administrative computing device 105 and the one or more computing devices 130. For example, the network 120 may include wide area networks (WANs), such as the Internet and cellular networks, and/or private networks, such as local area networks (LANs). The network may include wired or wireless interfaces and may execute on any appropriate protocols, such as Internet Protocol (IP).

The process module 110 may execute on and/or with respect to the administrative computing device 105. The process module 110 may be all or portions of software or hardware. For example, the process module 110 may include one or more executable files with instructions that, when executed by one or more processors of the administrative computing device 105, cause the administrative computing device 105 to perform steps specified by the instructions.

The computing devices 130 may be configured to transmit and/or receive data. For convenience, data that has been or is predicted to have been transmitted may be referred to herein as transmitted data. Data may include any content which may be transmitted over the network 120. For example, data may include textual, audio, or video content, measurements, computer system files, or the like. Data may be transmitted through one or more computing devices before reaching an intended destination. A computing device may be a transmitting computing device (that is, a sender), a receiving computing device (that is, a recipient), or an intermediary computing device (that is, both a receiver and a sender).

As part of transmitting, receiving, and/or storing data, a computing device may generate and/or store status data. Status data may be metadata associated with the transmitted data, regardless of whether the data is received, sent, or stored. The status data may include an indication of a time when the data was received, sent, and/or stored. The status data may additionally or alternatively include a hash value associated with data, such as a Message Digest 5 (MD5) hash of the transmitted data. The status data may additionally or alternatively include a size value of the transmitted data, an indication of the type of transmitted data, and/or other characterizations or measurements associated with the transmitted data. The status data may additionally or alternatively include information regarding transmission errors, processing issues, and/or any other information relevant to the transmission and/or processing of the transmitted data.

The process module 110 may be configured to receive status data from the computing devices 130. The process module 110 may query one of or more of the computing devices 130 for status data. The query may include an indication of the transmitted data. For example, the process module 110 may query one or more of the computing devices 130 for status data for particular transmitted data, or may query one or more of the computing devices 130 for all status data currently stored. The status data may be received over the network 120.

The computing devices 130 may be associated with one or more owners and need not be located in the same or similar locations. A first set of the computing devices 130 may be associated with a first company in a first country (or region, state, city, address, and the like), and a second set of the computing devices 130 may be associated with a second company in a second country (or region, state, city, address, and the like). The companies may be on entirely different portions of the network 120. As such, the process module 110 may be configured to authenticate with one or more portions of the network 120 in order to request and/or retrieve status data from the computing devices 130.

Figure 2:
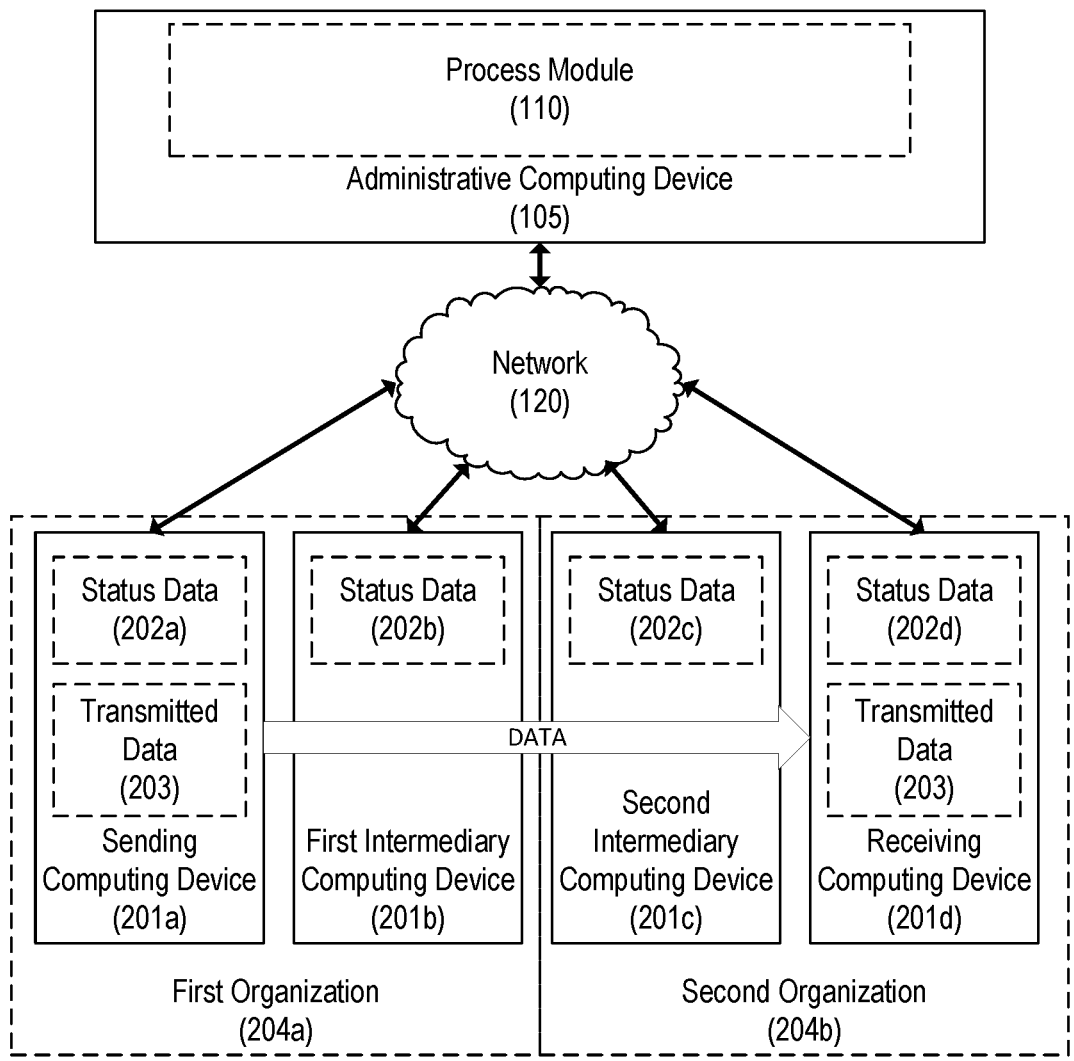
FIG. 2 shows an example transmission of data from a sending computing device in a first organization to a receiving computing device in a second organization.

FIG. 2 is a more detailed example of the flow of data between computing devices. A sending computing device 201a, first intermediary computing device 201b, second intermediary computing device 201c, and receiving computing device 201d may be all or portions of the computing devices 130. Though two intermediary computing devices are shown, any number may be implemented. In some cases, no intermediary computing devices may be used. The sending computing device 201a and the first intermediary computing device 201b may be part of a first organization 204a, whereas the second intermediary computing device 201c and the receiving computing device 201d may be part of a second organization 204b. The sending computing device 201a is associated with status data 202a, the first intermediary computing device 201b is associated with status data 202b, the second intermediary computing device 201c is associated with status data 202c, and the receiving computing device 201d is associated with status data 202d. The status data 202a, status data 202b, status data 202c, and status data 202c may be associated with transmitted data 203, which may be transmitted from the sending computing device 201a to the receiving computing device 201d. As shown in FIG. 2, the data is transmitted from the sending computing device 201a to the first intermediary computing device 201b, then from the first intermediary computing device 201b to the second intermediary computing device 201c, then from the second intermediary computing device 201c to the receiving computing device 201d.

The transmitted data 203 is shown twice: once at the sending computing device 201a and again as received at the receiving computing device 201d. As will be explained below, though the transmitted data 203 is shown to be the same in FIG. 2, the transmitted data 203 may be modified by one or more devices, including the sending computing device 201a and/or the first or secondary intermediary computing devices 201b-c, before reaching the receiving computing device 201d. As such, the transmitted data 203 shown in the receiving computing device 201d may be the same or different than the transmitted data 203 shown in the sending computing device 201a.

The sending computing device 201a may send the transmitted data 203 to the receiving computing device 201d based on a request by the receiving computing device 201d. The sending computing device 201a may send the transmitted data 203 independently or may send the transmitted data 203 responsive to an instruction from another computing device (e.g., a request from the receiving computing device 201d). The transmitted data 203 may be, for example, an encrypted file containing sensitive network authentication information, and the sending computing device 201a may transmit the sensitive network authentication information to the receiving computing device 201d responsive to a request by the receiving computing device 201d.

The transmission of the transmitted data 203 from the sending computing device 201a to the receiving computing device 201d may entail one or more transmission errors. A transmission error may be any error associated with the transmission of the transmitted data 203, including errors relating to storage devices involved in the processing of transmitting data from one device to another. For example, during transmission, all or portions of the transmitted data 203 may be lost. As another example, a malfunctioning storage device at an intermediary computing device may cause data to become corrupt when stored and/or transmitted to another device.

Moreover, throughout the transmission process, the transmitted data 203 may be modified by one or more devices, such as the first intermediary computing device 201b, the second intermediary computing device 201c, and/or the receiving computing device 201d. For example, the data sent by the sending computing device 201a may be modified by the first intermediary computing device 201b to add or remove data, rearrange data, reformat data, repackage data, or the like. Subsequent intermediary computing devices along the transmission path may also modify the transmitted data.

The sending computing device 201a, the first intermediary computing device 201b, the second intermediary computing device 201c, and the receiving computing device 201d may all generate and/or store status data responsive to receiving, storing, and/or sending the transmitted data 203. Status data need not be the same between two computing devices. For example, the status data 202b may include a timestamp that is earlier than a timestamp of the status data 202c because the transmitted data 203 was received by the first intermediary computing device 201b sooner than the second intermediary computing device 203c.

The process module 110 need not retrieve status data in any particular order. The process module 110 may first query a receiving computing device for status data first in order to determine if the transmitted data 203 was ultimately received. Based on determining, for example, that the transmitted data 203 was not received, the process module 110 may query either the sending computing device 201a to determine whether the transmitted data 203 was sent at all, and/or may query the second intermediary computing device 201c to determine whether status data (e.g., status data 202c) exists on the second intermediary computing device 201c. As such, the process module 110 may use the status data as a form of "breadcrumbs" to determine where data may currently be received and/or stored. In other words, the status data residing on the receiving devices may represent a trail that can be followed in order to determine the path the data took from a sending computing device (e.g., sending computing device 201a), through intermediary computing devices (e.g., first and second intermediary computing devices 201b and 201c), and to a receiving computing device (e.g., receiving computing device 201d).

The status data may be different based on the role played by a given computing device. For example, the status data 202a corresponding to the sending computing device 201a may indicate a timestamp (e.g., when the data was sent), a hash value of the data, and/or the like. The status data 202b and status data 202c corresponding to the intermediary computing devices may store a first timestamp of when the transmitted data 203 was received, a second timestamp of when the transmitted data 203 was sent, an indication of any processing performed on the transmitted data 203, a hash value of the data as received and/or as transmitted, and/or the like. The status data 202d corresponding to the receiving computing device 201d may store a timestamp corresponding to when the transmitted data 203 was received, a hash value of the data as received, and/or the like.

Status data may be missing, incomplete, or indicate errors, including transmission errors. For example, expected status data may be missing. Status data may indicate, for example, that a computing device never received the transmitted data 203, received a malformed version of the transmitted data 203, and/or failed to transmit the transmitted data 203. The hash value in subsequent status data may be different than a previous hash value in status data, indicating that the transmitted data 203 was manipulated or malformed in transmission.

Figure 3:
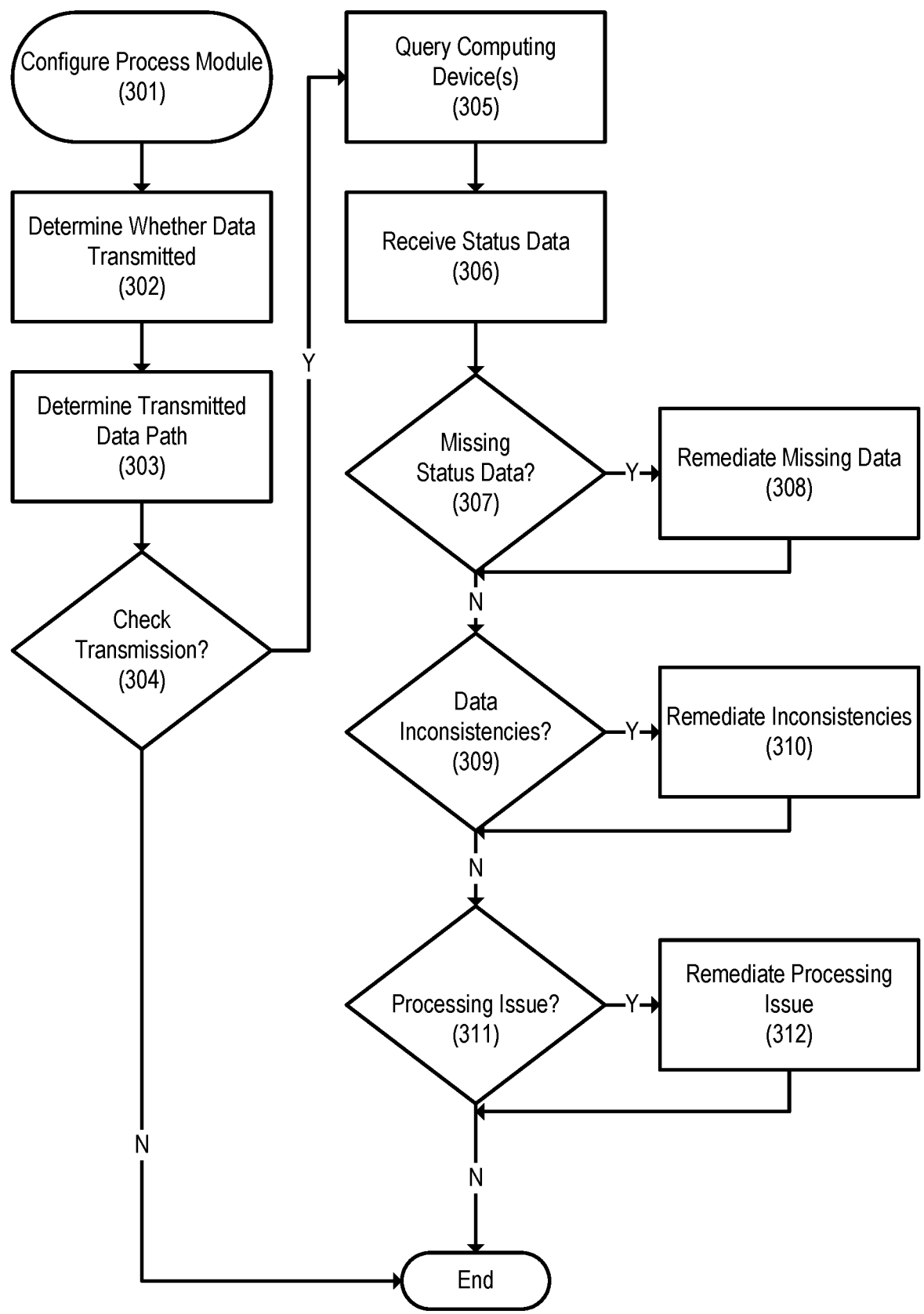
FIG. 3 shows a flow chart of example method steps for remediating data transmissions.

FIG. 3 is a flow chart of example method steps which may be performed by the process module 110 of the administrative computing device 105. In step 301, the process module 110 may be configured. One or more rules may be established which specify conditions in which the process module 110 is to retrieve status data. For example, if the receiving computing device 201d transmits an acknowledgement to the process module 110 that the transmitted data 203 has been successfully received, then the process module 110 may be configured to not request and receive status data. The process module 110 may be further configured with specific settings, such as particular parameters of status data to retrieve. For example, status data may comprise a large set of information regarding received/sent data; however, the process module 110 may be configured to retrieve only hash values corresponding to transmitted data.

In step 302, the process module 110 may determine whether data has been transmitted. The determination may include receiving, from the sending computing device 201a, an indication that transmitted data has been sent. For example, the process module 110 may receive an indication from the sending computing device 201a that it transmitted the transmitted data 203, and the process module 110 may be configured to perform the steps depicted in FIG. 3 on a periodic basis to determine the status and/or location of the transmitted data 203. As another example, intermediary computing devices may transmit status data to the process module 110, such that the process module 110 may infer from the status data that data has been sent. As yet another example, the process module 110 may periodically receive a list of all data transmissions made in a time period, and the process module 110 may be configured to perform the steps depicted in FIG. 3 for a data transmission on the list. The indication that the data has been sent may comprise an identifier for the transmitted data 203 and/or devices, such as the sending computing device 201a. The indication that the data has been sent may, but need not, include status data such as the status data 202a. For example, the sending computing device 201a may indicate to the process module 110 that the transmitted data 203 has been sent, and the process module may respond with a query for the status data 202a. The process module 110 may additionally or alternatively periodically query one or more computing devices for information (e.g., status data) relating to transmitted data over a period of time.

In step 303, based on the transmitted data, the process module 110 may determine a transmission path for the transmitted data 203. The transmission of data from a sending computing device to a receiving computing device may necessarily and/or optionally entail the transmission of the data via one or more intermediary computing devices. The transmission path may include an indication of the one or more intermediary computing devices through which transmitted data may flow to reach a receiving computing device. Transmitted data may travel through one of a plurality of intermediary computing devices based on then-current network conditions, the nature of the transmitted data, or the like. There may be a plurality of paths which the transmitted data 203 may take to reach a receiving computing device. As such, the actual path used by the transmitted data 203 may be determined and/or predicted from a plurality of different transmission paths that the data may use to reach the receiving computing device 201d. For example, the process module 110 may determine that the transmitted data 203 traveled along a predicted transmission path because the predicted transmission path is the fastest and/or easiest and/or most logical way for the transmitted data to reach a receiving computing device. As another example, a plurality of different possible transmission paths may be weighted based on the likelihood that the path was used to transmit the transmitted data 203, with the process module 110 determining a predicted path, of the plurality of different possible transmission paths, that is weighted the highest. The predicted path may comprise one or more intermediary computing devices predicted to have been involved in transmitting the transmitted data 203. For example, each path of the plurality of different possible transmission paths may include different intermediary computing devices.

In step 304, the process module 110 may determine whether to check the transmission of the transmitted data 203. Based on the transmitted data 203 and/or the transmitted transmission path, the process module 110 may determine not to check the transmission of the transmitted data 203. For example, the transmitted data 203 may be inconsequential such that the transmission is not sufficiently important, or the transmission path may be so trusted or secure that data transmission integrity may be assumed. The opposite may apply: the transmitted data 203 may be so important and/or the transmission path so insecure that checking the integrity of the transmission of the transmitted data 203 may be warranted. For example, an importance of the transmitted data 203 may meet a predetermined threshold, indicating that the transmission of the transmitted data 203 should be checked. Meeting a threshold may include being equal to, greater than, greater than or equal to, less than, or less than or equal to the threshold. If, based on the transmitted data 203 and the transmitted transmission path, the process module 110 determines to check the transmission, the flow chart may proceed to step 305. Otherwise, the process may end.

In step 305, based on a decision to check the transmission, the process module 110 may query one or more computing devices for status data. The query may be transmitted over the network 120. The query may include an indication of the transmitted data 203 (e.g., a unique identifier for the data itself, a unique identifier for the transmission of the transmitted data 203, or the like) such that the queried computing device may determine, from a plurality of status data, which status data corresponds to the transmitted data 203. For example, the query may include a unique identifier of the transmitted data 203 (e.g., a hash value) such that the queried computing device may determine whether data matching the hash was received and/or transmitted.

In step 306, the process module 110 may receive the status data. The status data may be received over the network. Status data need not be in any particularized format, and may be sent in a single transmission or over multiple transmissions. For example, the computing device may send an Extensible Markup Language (XML) reply comprising timestamp information and/or hash information. The status data may be for one or more computing devices. For example, steps 305 and 306 may be performed for all computing devices in one or more transmission paths. As such, the received status data need not relate merely to one computing device, but may relate to portions or all of computing devices in one or more transmission paths for the transmitted data 203.

In step 307, the process module 110 may determine whether, based on the status data received, status data is missing. A computing device queried may have been expected to have status data corresponding to the transmitted data 203; however, no status data may have been received. This may be because, for example, the transmitted data 203 was never received by the computing device and/or because the computing device has an error which prevented it from generating the status data. If all or portions of the status data are missing, the flow chart may proceed to step 308. Otherwise, the flow chart may proceed to step 309.

Throughout steps 308, 310, and/or 312, remedial action may be taken to handle issues determined in steps 307, 309, and/or 311. Remedial action may include any actions performed by one or more devices with respect to the data, e.g., repairing the data, quarantining the data, seeking and retrieving the data for transmission, or the like. Steps 308-311 are exemplary; any number of data checks and/or remedial actions may be taken in accordance with the features described herein.

In step 308, the process module 110 may take steps to remediate the missing status data determined in step 307. The process module 110 may be configured to determine a cause of the missing status data. If the status data is missing because of a transmission error (e.g., a wireless connection being inadvertently disconnected, causing the transmitted data to be sent but not received), the process module 110 may cause the transmitted data to be retransmitted from the previous computing device. This process may require investigation into multiple previous computing devices in the transmission path: for example, a computing device some number of transmissions previously may have failed to send the data. If the status data is missing because the computing device failed to generate status data, the process module 110 may cause the computing device to generate and transmit the status data.

In step 309, the process module 110 may determine whether, based on the status data received, there are inconsistencies with respect to the transmitted data 203. An inconsistency may be based on a comparison of one or more hash values. For example, if two hash values from two different computing devices differ, then the transmitted data 203 may have been modified during transmit, suggesting a transmission error or other related concerns. If a receiving timestamp from a receiving computing device is earlier than a sending timestamp from a sending computing device, the inconsistency may correspond to an error in the internal clock of one or both of the computing devices. If an inconsistency is determined, the flow chart may proceed to step 310. Otherwise, the flow chart may proceed to step 311.

In step 310, based on determining that there are inconsistencies in step 309, the process module 110 may remediate the inconsistencies. If two hash values are found inconsistent, the process module 110 may determine whether the transmitted data 203 is untrustworthy. For example, if the hash values are inconsistent because a transmission error corrupted the transmitted data 203, the transmitted data 203 as received may be discarded, and the process module 110 may cause the transmitted data 203 to be retransmitted. The process module 110 may determine that, based on a hash value inconsistency, one or more computing devices are compromised, and may cause those devices to be quarantined and/or removed from a network. If two time stamps suggest an inaccuracy with regard to an internal clock of a computing device, the process module 110 may cause the computing device to correct its internal clock and/or standardize the internal clock to a reference point.

In step 311, the process module 110 may determine whether, based on the status data, a processing issue appears to have occurred with one or more computing devices. A processing issue may be any error or problem associated with processing the transmitted data 203. A processing issue may be, for example, that the transmitted data 203 has been received but is still undergoing processing, or that the transmitted data 203 was received but was deleted because it failed an anti-virus scan. Two timestamps may be compared, and if a difference between the timestamps exceeds a threshold (e.g., a full day), a processing error may be suggested. If a processing issue is determined, the flow chart may proceed to step 312. Otherwise, the process may end.

In step 312, if a processing issue is determined, the process module 110 may take steps to take a remedial action. For example, if the transmitted data 203 is taking too long to process, the remedial action may include, for example, causing the computing device(s) performing an executing process associated with the transmitted data 203 to cancel and re-execute the process. As another example, if the transmitted data 203 was deleted for security purposes, e.g., as part of a virus scan, the remedial action may entail informing other computing devices of the possibility that the transmitted data 203 is insecure. As yet another example, remedial action may include running diagnostic tests on one or more computing devices, such as intermediary computing devices and/or a sending computing device and/or a receiving computing device.

In steps 307 through 312, the importance of the transmitted data may be taken into account. Data importance may include a subjective importance of the transmitted data, e.g., to either the sending computing device 201a and/or to the receiving computing device 201d. For example, if the transmitted data 203 is considered extremely important (e.g., if the transmitted data 203 comprises authentication information and/or financial information), the remedial actions taken in steps 308, 310, and/or 312 may be more detailed or involved than if the transmitted data 203 is considered unimportant (e.g., if the transmitted data 203 comprises optional graphical content for a web page, such as Cascading Style Sheet information). Data importance may also be an objective importance of the transmitted data as indicated by a value associated with the data, e.g., a parameter of a Quality of Service (QoS) agreement. The transmitted data 203 may indicate its importance, and/or status data corresponding to the transmitted data 203 may include information relating to the importance of the transmitted data 203. Transmission of the data 203 may be prioritized along the transmission path based on the importance (whether subjective or objective) that is associated with the data.

Figure 4:
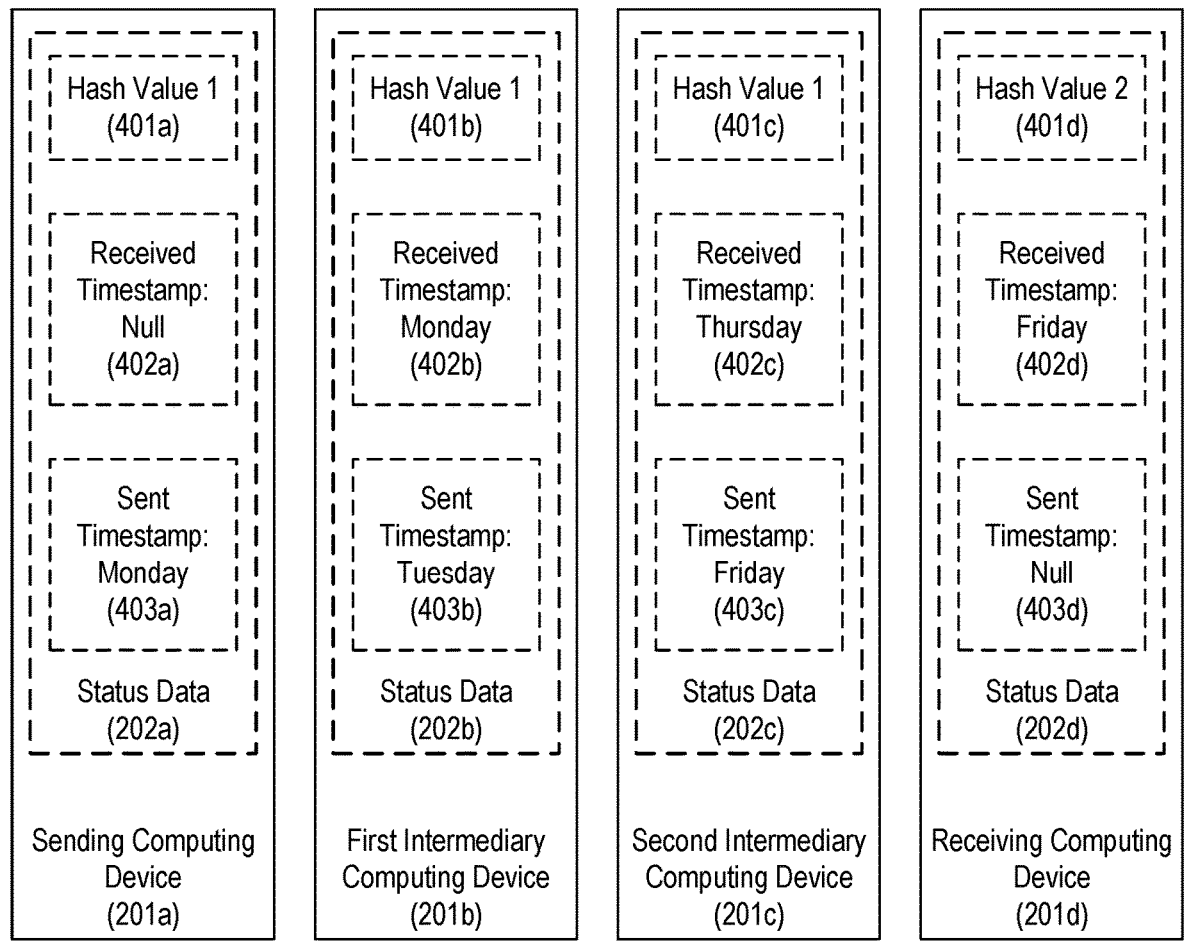
FIG. 4 shows example status data which may be generated during a transmission of data.

FIG. 4 is a simplified block diagram example of status data 202a-d which may be received by the process module 110 from the computing devices 130. The example status data is shown to have a hash value (401a-d), a timestamp (402a-d) that the transmitted data 203 was received, and a timestamp (403a-d) that the transmitted data 203 was sent. For simplicity, the timestamps 402a-d shown in FIG. 4 days of the week; however, any form or style of timestamp may be used (e.g., timestamps according to International Organization for Standardization (ISO) 8061, such as 2018-05-15T12:00:05+00:00).

As shown in FIG. 4, the sending device 201a has a null received timestamp 402a because it is the sending device, and per the sent timestamp 403a transmits the transmitted data 203 on Monday. The first intermediary computing device 201b, per received timestamp 402b and sent timestamp 403b, receives the transmitted data 203 on Monday and sends the transmitted data on Tuesday. The second intermediary computing device 201c, per received timestamp 402c and sent timestamp 403c, receives the transmitted data 203 on Thursday and sends the transmitted data on Friday. The receiving computing device 201d, per received timestamp 402d and sent timestamp 403c (which is null), receives the transmitted data 203 on Friday.

The hash value 401c and the hash value 401d, in this example, are different, which, as discussed above, suggests that the version of the transmitted data 203 received by the receiving computing device 201d is different than the version of the transmitted data 203 sent by the second intermediary computing device 201c. This may be intended, particularly where the transmitted data 203 is modified by one or more devices during transmission. For example, if the second intermediary computing device is configured to perform processing operations on the transmitted data 203, then the transmitted data 203 may be intended to change. In such circumstances, the computing device performing the processing operations may be configured to store two hash values: one pre-processing, and one post-processing, such that the process module 110 may identify the change as intended. Conversely, changes in the transmitted data 203 may be undesirable. For example, a change in the transmitted data 203 may be associated with data loss or corruption.

The sent timestamp 403b and the received timestamp 402c suggest that transmission of the transmitted data 203 took two days, which may suggest network issues warranting remediation by the process module 110. For example, the process module 110 may detect that a network between the first intermediary computing device 201b and the second intermediary computing device 201c is experiencing high transmission delays due to congestion and, in response, may route future data transmissions via a different network. It should be appreciated that a delay on the scale of days is presented only as an example and that, additionally or alternatively, delays may be measured on the scale of nanoseconds, milliseconds, seconds, minutes, hours, weeks, months, years, and other durations.

The received timestamp 402c and the sent timestamp 403c indicate that the second intermediary computing device 201c took a day to transmit the transmitted data 203, which may suggest an undesirable processing delay. Processing issues, like undesirable processing delays at one or more computing devices, may be associated with data corruption, excessively long times to transmit received data, or the like. The process module 110 may be configured to detect these processing issues and, as detailed above, remediate them.

Figure 5:
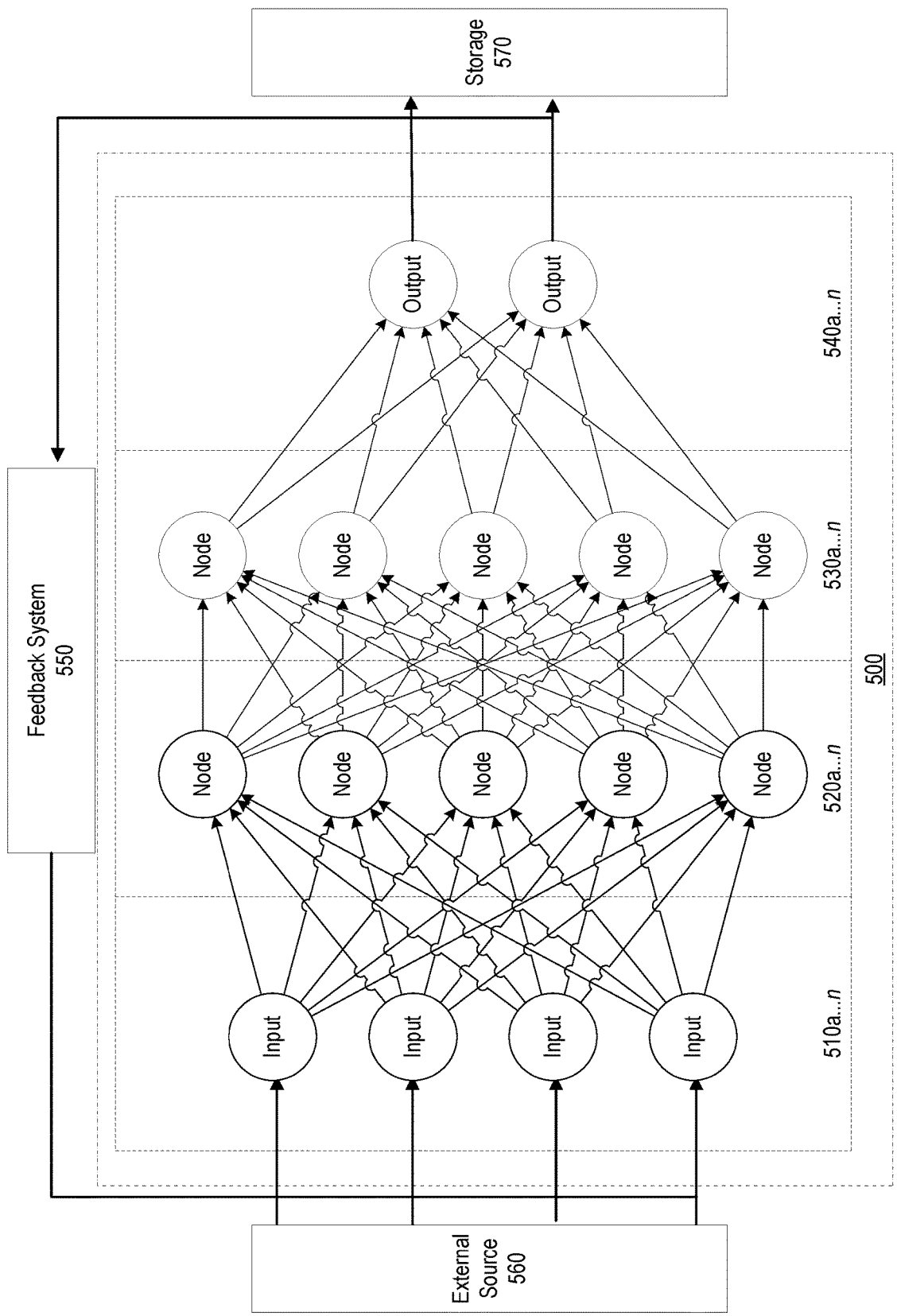
FIG. 5 shows an example of an artificial neural network.

FIG. 5 shows a simplified example of an artificial neural network 500, which may be used by the process module 110. FIG. 5 shows one example of nonlinear processing using an artificial neural network; other forms of nonlinear processing may be used to implement the process module 110.

An artificial neural network, such as the artificial neural network 500, may be used as all or portions of the process module 110 with respect to status data received. For example, transmitted data 203 may involve transmission via hundreds of different intermediary computing devices, each with corresponding status data. Given the volume of this status data, and the speed with which it may be generated, traditional programmatic analysis might not be sufficient to provide useful and/or timely results. As such, the artificial neural network 500 may be trained on sets of status data such that voluminous sets of status data may be processed by the artificial neural network to determine whether the set includes outliers worthy of remediation. For example, the artificial neural network 500 may be provided historical data transmissions, and future data transmissions may be compared based on the training. The data input into the artificial neural network 500 may include more than the status data. For example, the data input into the artificial neural network 500 may include additional information regarding the bandwidth and/or operating status of one or more networks used to transmit data such as the transmitted data 203.

Each of input nodes 510a-n is connected to a first set of processing nodes 520a-n. Each of the first set of processing nodes 520a-n is connected to each of a second set of processing nodes 530a-n. Each of the second set of processing nodes 530a-n is connected to each of output nodes 540a-n. Though only two sets of processing nodes are shown, any number of processing nodes may be implemented. Similarly, though only four input nodes, five processing nodes, and two output nodes per set are shown in FIG. 5, any number of nodes may be implemented per set. Data flows shown in FIG. 5 are depicted from left to right: data may be input into an input node, may flow through one or more processing nodes, and may be output by an output node. Input into the input nodes 510a-n may originate from an external source 560, e.g., the computing devices 130. Output may be sent to a feedback system 550 and/or to storage 570, which may be all or portions of the administrative computing device 105. The feedback system 550 may send output to the input nodes 510a-n for successive processing iterations with the same or different input data.

The nodes depicted in FIG. 5 may be any form of processing, such as discrete computing devices, programs, and/or mathematical functions implemented by a computing device. For example, the input nodes 510a-n may include logical inputs of different data sources (e.g., data servers), the processing nodes 520a-n may include parallel processes executing on multiple servers in a data center, and the output nodes 540a-n may be the logical outputs which ultimately are stored in results data stores (e.g., the same or different data servers as for the input nodes 510a-n). Nodes need not be distinct. For example, two nodes in any two sets may perform the exact same processing. The same node may be repeated for the same or a different sets.

Each of the nodes may be connected to one or more other nodes. Such connections may be referred to as edges. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 500 may learn and/or be dynamically reconfigured. Though nodes are depicted as having connections only to successive nodes in FIG. 5, connections may be formed between any nodes. For example, one processing node may be configured to send output to a previous processing node.

Input received in the input nodes 510a-n may be processed through processing nodes, such as the first set of processing nodes 520a-n and the second set of processing nodes 530a-n. The processing may result in output in output nodes 540a-n. As depicted by the connections from the first set of processing nodes 520a-n and the second set of processing nodes 530a-n, processing may include multiple steps or sequences. For example, the first set of processing nodes 520a-n may be a rough data filter, whereas the second set of processing nodes 530a-n may be a more detailed data filter.

The artificial neural network 500 may be configured to effectuate and/or assist with decision-making. As a simplified example for the purposes of explanation, the artificial neural network 500 may be configured to detect whether a set of computing devices are likely corrupting the transmitted data 203. The first set of processing nodes 520a-n may be each configured to perform specific steps to determine inconsistencies in hash values of status data. The second set of processing nodes 530a-n may be each configured to analyze the nature of such inconsistencies, such as how the inconsistencies propagate across computing devices over time. Multiple subsequent sets may further refine this processing, each looking for further more specific tasks, with each node performing some form of processing which need not necessarily operate in the furtherance of that task. The artificial neural network 500 may then predict one or more computing devices and/or portions of the network that are potentially corrupting the transmitted data 203. The prediction may be correct or incorrect.

The feedback system 550 may be configured to determine whether or not the artificial neural network 500 made a correct decision. Feedback may include an indication of a correct answer and/or an indication of an incorrect answer and/or a degree of correctness (e.g., a percentage). The feedback system 550 may already know a correct answer, such that the feedback system may train the artificial neural network 500 by indicating whether it made a correct decision. The feedback system 550 may include human input, such as input received from an administrator telling the artificial neural network 500 whether it made a correct decision. The feedback system may provide feedback (e.g., an indication of whether the previous output was correct or incorrect) to the artificial neural network 500 via input nodes 510a-n or may transmit such information to one or more nodes. The feedback system 550 may additionally or alternatively be coupled to the storage 570 such that output is stored. The feedback system need not have correct answers at all, but instead base feedback on further processing: for example, the feedback system may include a system programmed to determine data corruption, such that the feedback allows the artificial neural network 500 to compare its results (e.g., a prediction of data corruption or tampering) to that of a manually programmed system.

The artificial neural network 500 may be dynamically modified to learn and provide better input. Based on previous input and output and feedback from the feedback system 550, the artificial neural network 500 may modify itself. For example, processing in nodes may change and/or connections may be weighted differently. The modifications may be predictions and/or guesses by the artificial neural network 500, such that the artificial neural network 500 may vary its nodes and connections to test hypotheses.

The artificial neural network 500 need not have a set number of processing nodes or number of sets of processing nodes, but may increase or decrease its complexity. For example, the artificial neural network 500 may determine that one or more processing nodes are unnecessary or should be repurposed, and either discard or reconfigure the processing nodes on that basis. As another example, the artificial neural network 500 may determine that further processing of all or part of the input is required and add additional processing nodes and/or sets of processing nodes on that basis.

The feedback provided by the feedback system 550 may be mere reinforcement (e.g., providing an indication that output is correct or incorrect, awarding the machine learning model a number of points, or the like) or may be specific (e.g., providing the correct output). For example, the artificial neural network 500 implementing a machine learning model may be asked to determine whether input data is corrupt. Based on an output, the feedback system 550 may indicate a score (e.g., 75% accuracy, an indication that the guess was accurate, or the like) or a specific response (e.g., specifically identifying located portion of the data that is corrupt).

The artificial neural network 500 may be supported or replaced by other forms of machine learning. For example, one or more of the nodes of artificial neural network 500 may implement a decision tree, associational rule set, logic programming, regression model, cluster analysis mechanisms, Bayseian network, propositional formulae, generative models, or other models or forms of decision-making. The artificial neural network 500 may effectuate deep learning.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, random access memory (RAM), and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may include one or more non-transitory computer-readable media.

Although examples are described above, features and/or steps of those examples may be combined, divided, omitted, rearranged, revised, and/or augmented in any desired manner. Various alterations, modifications, and improvements will readily occur to those skilled in the art. While some elements may be expressed as singular or plural, such elements may be either singular or plural in various embodiments. For example, though a single process module 110 is described, multiple process latency modules may be used in accordance with the features described herein. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   determining, by an administrative computing device, a transmission of data from a sending computing device to a receiving computing device;
   determining, by the administrative computing device, a transmission path used to transmit the data, wherein the transmission path comprises a plurality of computing devices, and wherein the plurality of computing devices includes the sending computing device, one or more intermediary computing devices which are predicted to have been involved in transmitting the data from the sending computing device to the receiving computing device, and the receiving computing device;
   determining, based on the transmission path, whether to check the transmission of the data for errors;
   based on determining to check the transmission of the data for errors:
     requesting, from at least one of the plurality of computing devices, status data corresponding to the data;
     receiving the status data;
     determining, based on the status data, a transmission error corresponding to a first computing device of the plurality of computing devices, wherein the transmission error is associated with a processing issue corresponding to the first computing device; and
     causing, based on the transmission error, the first computing device to perform a remedial action, wherein the remedial action comprises causing the first computing device to cancel and restart an executing process.

2. The method of claim 1, wherein the status data comprises a plurality of hash values corresponding to the data, and wherein determining the transmission error further comprises determining that at least two of the hash values do not match.

3. The method of claim 2, wherein the remedial action further comprises deleting a version of the data which corresponds to one of the at least two has values.

4. The method of claim 1, wherein the status data comprises a plurality of timestamps corresponding to the transmission, and wherein determining the transmission error further comprises determining that a difference between a first timestamp and a second timestamp of the plurality of timestamps meets a threshold.

5. The method of claim 1, wherein the transmission error is based on determining that the status data received does not comprise expected status data.

6. The method of claim 1, wherein the administrative computing device comprises an artificial neural network, wherein the artificial neural network comprises a plurality of nodes, wherein the nodes are configured to process an input, and wherein the plurality of nodes is configured based on historical data transmissions.

7. The method of claim 1, wherein determining whether to check the transmission for errors is further based on an importance of the data.

8. The method of claim 1, wherein the sending computing device is associated with a first organization, and the receiving computing device is associated with a second organization.

9. The method of claim 1, wherein determining the transmission path used to transmit the data comprises determining which of a plurality of different transmission paths, between the sending computing device and the receiving computing device, was used to transmit the data.

10. An apparatus comprising:
one or more processors; and
memory storing instructions that, when executed by the one or more processors, cause the one or more processors to:
determine a transmission of data from a sending computing device to a receiving computing device;
determine a transmission path used to transmit the data, wherein the transmission path comprises a plurality of computing devices, and wherein the plurality of computing devices includes the sending computing device, one or more intermediary computing devices which are predicted to have been involved in transmitting the data from the sending computing device to the receiving computing device, and the receiving computing device;
determine, based on the transmission path, whether to check the transmission of the data for errors;
based on determining to check the transmission of the data for errors:
request, from at least one of the plurality of computing devices, status data corresponding to the data;
receive the status data;
determine, based on the status data, a transmission error corresponding to a first computing device of the plurality of computing devices, wherein the transmission error is associated with a processing issue corresponding to the first computing device; and
cause, based on the transmission error, the first computing device to perform a remedial action, wherein the remedial action comprises causing the first computing device to cancel and restart an executing process.

11. The apparatus of claim 10, wherein the status data comprises a plurality of hash values corresponding to the data, and wherein determining the transmission error further comprises determining that at least two of the hash values do not match.

12. The apparatus of claim 11, wherein the remedial action further comprises deleting a version of the data which corresponds to one of the at least two has values.

13. The apparatus of claim 10, wherein the status data comprises a plurality of timestamps corresponding to the transmission, and wherein determining the transmission error further comprises determining that a difference between a first timestamp and a second timestamp of the plurality of timestamps meets a threshold.

14. An system comprising:
a sending computing device having at least a first memory and processor and configured to transmit data to a receiving computing device; and
an apparatus having at least a second memory and processor and, configured to:
determine a transmission of data from the sending computing device to the receiving computing device;
determine a transmission path used to transmit the data, wherein the transmission path comprises a plurality of computing devices, and wherein the plurality of computing devices includes the sending computing device, one or more intermediary computing devices which are predicted to have been involved in transmitting the data from the sending computing device to the receiving computing device, and the receiving computing device;
determine, based on the transmission path, whether to check the transmission of the data for errors;
based on determining to check the transmission of the data for errors:
request, from at least one of the plurality of computing devices, status data corresponding to the data;
receive the status data;
determine, based on the status data, a transmission error corresponding to a first computing device of the plurality of computing devices, wherein the transmission error is associated with a processing issue corresponding to the first computing device; and
cause, based on the transmission error, the first computing device to perform a remedial action, wherein the remedial action comprises causing the first computing device to cancel and restart an executing process.

15. The system of claim 14, wherein the status data comprises a plurality of hash values corresponding to the data, and wherein determining the transmission error further comprises determining that at least two of the hash values do not match.

16. The system of claim 15, wherein the remedial action further comprises deleting a version of the data which corresponds to one of the at least two has values.

17. The system of claim 14, wherein the status data comprises a plurality of timestamps corresponding to the transmission, and wherein determining the transmission error further comprises determining that a difference between a first timestamp and a second timestamp of the plurality of timestamps meets a threshold.

* * * * *